May 21, 1968 J. HERMANN 3,384,325
MISSILE WITH THRUST VECTOR CONTROL
Filed Dec. 5, 1966 2 Sheets-Sheet 1

INVENTOR
Joachim Hermann
By *Mc Glew and Toren*
ATTORNEYS

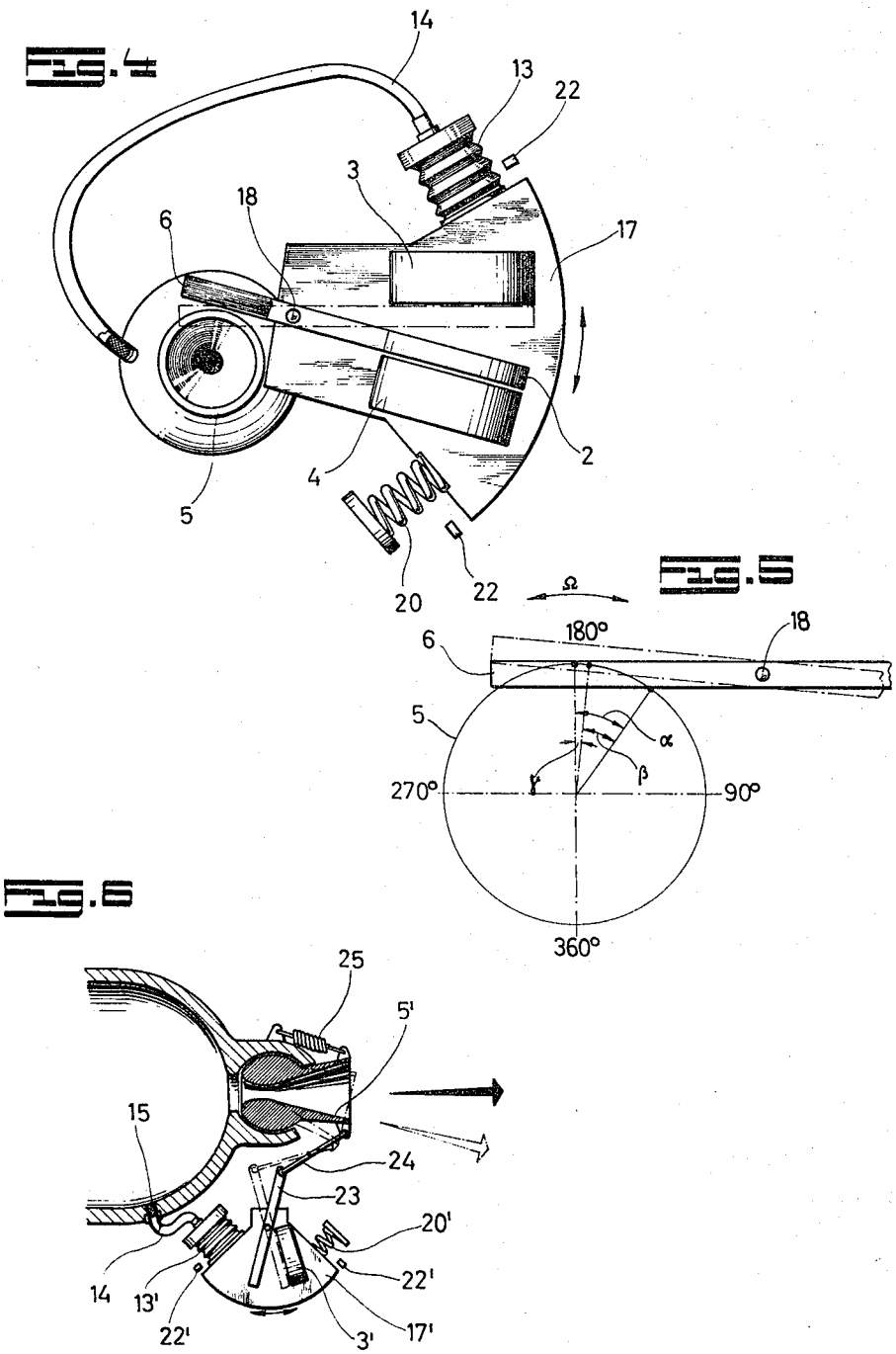

3,384,325
MISSILE WITH THRUST VECTOR CONTROL
Joachim Hermann, Munich, Germany, assignor to Bolkow Gesellschaft mit beschrankter Haftung, Ottobrunn, near Munich, Germany
Filed Dec. 5, 1966, Ser. No. 599,305
Claims priority, application Germany, Dec. 10, 1965, B 84,921
10 Claims. (Cl. 244—3.22)

ABSTRACT OF THE DISCLOSURE

Lateral guidance of a jet propelled missile is effected by controlling the effective thrust vector of the jet relative to the longitudinal axis of the missile. Such control may be effected either by dipping a jet spoiler into the jet cross section of the engine, or by angularly deflecting a jet discharge nozzle. Variation of the thrust vector is under the control of guiding signals from a control station. However, control of the thrust vector must take into consideration the pressure in the combustion chamber producing the propulsion jet, or, stated another way, the thrust of the propulsion jet.

The present invention is directed to a thrust vector control whereby the degree to which a spoiler is dipped into the jet, or the angular displacement of a jet nozzle, are controlled or compensated in accordance with the thrust of the jet as measured by the pressure in the combustion chamber, and particularly with respect to whether the missile is accelerating or is cruising at a substantially constant velocity following acceleration.

Background of the invention

The present invention is directed to thrust vector controls for jet propelled missiles and, more particularly, to a novel thrust vector control wherein the thrust of the jet is taken into consideration in adjusting the thrust vector.

Control of the thrust vector of a jet propelled missile may be effected by dipping one or more jet spoilers into the jet cross section of the engine. Generally, these spoilers are dipped into the jet cross section to the same degree responsive to each control signal. The amplitude of the change of course of the missile, thus effected, is determined by the stay period of the spoiler or spoilers in the jet stream.

Such a control has the disadvantage that the change of course of the missile is dependent not only on the time during which the spoiler remains dipped in the jet but also on the instantaneous thrust of the engine. Particularly in missiles where the starting engine and the cruising engine work on the same nozzle, this leads to different changes of course of the missile, since the thrust is considerably greater during the acceleration phase than during the cruising phase. The same effect can also appear during the cruising phase if, due to different atmospheric conditions, the solid fuel engines, generally used, supply different thrusts. The adverse phenomenon just mentioned is also present when an angularly displaceable thrust nozzle is used for varying the thrust vector.

These different control effects, caused by different thrust vector variations, naturally produce counter-commands from the course and position supervision system of the missile. These commands are necessary in order to correct for unforeseen changes of course. With increased control effect, such corrections lead, however, to undesirably large oscillations of the missile about the theoretical course. Since the response time of a jet spoiler, or that of a pivotal or angularly displaceable thrust nozzle, is selected, for reasons of optimum control, to be as short as possible, a correction in the sense of a reduction of the stay period of a jet spoiler in the engine jet, or the stay period of the nozzle in its deflecting position, is possible only theoretically.

Summary of the invention

The invention is accordingly directed to the problem of designing a thrust vector control for a rocket-driven or jet propelled missile in such a way that, independently of the instantaneous thrust of the engine, a defined change of course of the missile is associated with a certain stay time of the spoiler in the thrust jet, or a certain time of angular deflection of the jet nozzle.

In accordance with the invention, this problem is solved by providing a thrust vector control, for a jet propelled missile, including at least one jet spoiler whose depth of immersion into the jet can be regulated in dependence on the pressure in the combustion chamber producing the propulsion jet. Alternatively, the problem is solved by providing, in a jet propelled missile, at least one angularly adjustable jet nozzle whose angle of adjustment can be regulated or compensated in accordance with the pressure in such combustion chamber.

By this surprisingly simple expedient, it is possible to provide equal changes of course for the missile with equal actuating times for the spoiler or for the pivotal or angularly adjustable thrust nozzle, and this can be accomplished with different thrusts, such as occur with different combustion chamber pressures. It is thus no longer necessary to maintain very narrow time tolerances for the dipping of the jet spoiler or the angular displacement of the thrust nozzle, and the same conditions can prevail for guiding the missile independent of whether the missile is in an acceleration phase or in a cruising phase, and independent of weather or atmospheric influences.

In a first, very simple and rugged embodiment of the invention, a pole shoe, acting as a spacer, is introduced by a lever mechanism between a lever arm of a spoiler, which lever arm acts as the armature of an electromagnet, and the respective control electromagnet. The amplitude of movement of the lever arm toward the control electromagnet is thus reduced and, correspondingly, the depth of immersion of the spoiler blade into the jet cross section of the engine is reduced.

In another preferred embodiment of the invention, the combustion chamber pressure is used to displace pivotally the entire spoiler system through the medium of a bellows filled with gas or liquid. When the entire spoiler system is pivoted about the axis of rotation of the spoiler, it is turned toward the exterior of the jet axis, so that the spoiler per se no longer dips fully into the jet cross section even in the operative state.

Due to this angular displacement of the entire spoiler system, the direction of the spoiler vector likewise changes. This variation can be used in twist-stabilized missiles for adaptation of the spoiler system to the lower rolling frequency of the missile during the acceleration phase. A compensation angle, used in balancing the time delay in the actuation of the spoiler system, must be smaller during the acceleration phase than during the cruising phase. This required variation of the value of the compensation angle corresponds rather accurately to the rotation or angular displacement of the spoiler system.

On the other hand, undesired rotations of the deflecting vector during the response of the immersion depth adjustment means can be sufficiently or completely avoided by known means, such as selection of a greater fulcrum distance, parallel construction, arrangement of the spoilers in pairs, etc. The same effects can also be obtained with the pivotal thrust nozzle actuated by the above described arrangements.

Accordingly, an object of the invention is to provide an improved thrust vector control for jet propelled missiles.

Another object of the invention is to provide a thrust vector control for jet propelled missiles, and in which the response of the vector control is made dependent upon the value of the thrust.

A further object of the invention is to provide a thrust vector control for jet propelled missiles and in which the response of the thrust vector control differs during the acceleration phase from its response during the cruising phase of the missile.

Yet another object of the invention is to provide a thrust vector control for jet propelled missiles and which is simple and reliable in construction and operation.

*Brief description of the drawings*

For an understanding of the principles of the invention, reference is made to the following description of typical embodiments thereof as illustrated in the accompanying drawings.

In the drawings:

FIG. 4 is a view, somewhat similar to FIG. 1, illustrating an alternative embodiment of the invention;

FIG. 5 is a graphical illustration of the variation of the compensation angle in twist-stabilized missiles, and using the principles of the present invention; and FIG. 6 illustrates the arrangement of FIG. 4 as used to control pivoting of an angularly adjustable jet nozzle.

*Description of the preferred embodiments*

While the embodiments of the invention are described in connection with a twist-stabilized missile having only one jet spoiler or only one thrust nozzle which can be turned in only one direction, it will be understood that the invention may be embodied in twist-stabilized missiles using more than one jet spoiler or using a thrust nozzle which can be turned in several directions.

Figure 1:
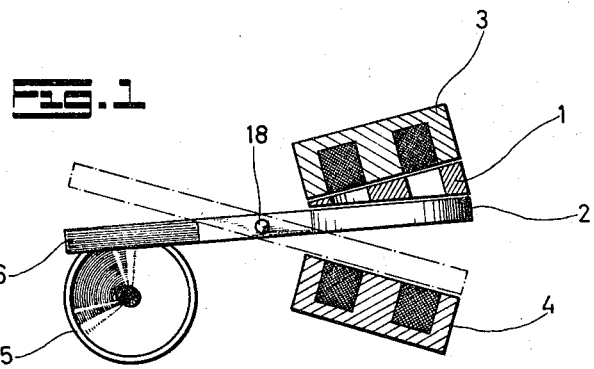
FIG. 1 is a somewhat schematic sectional view of one embodiment of the invention, using a pole shoe.

Referring to FIG. 1, a pole shoe 1 is arranged to be interposed between a lever arm 2 of a spoiler 6 and a control electromagnet 3. The lever arm 2 is designed as the armature of the electromagnet 3. When electromagnet 3 is energized, the blade of spoiler 6 is dipped into the propulsion jet stream of a missile, this missile not having been shown. If no change of course of the missile is desired, lever arm 2 of jet spoiler 6 is held attracted to a second control electromagnet 4. The jet spoiler is moved by the control electromagnets 3 and 4 in accordance with guiding signals received by the missile. Pole shoe 1, when in the position shown in FIG. 1, has the effect that the jet spoiler blade 6 can no longer dip so deeply into the jet, discharged from the combustion chamber nozzle 5, when electromagnet 3 is energized, as would be the case when the pole shoe 1 is withdrawn from the position interposed between electromagnet 3 and lever arm 2.

Figure 2A:
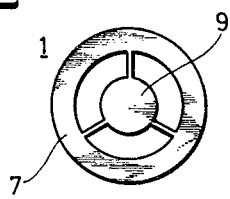
FIG. 2a is an elevational view of one form of pole shoe used in the arrangement of FIG. 1.

A preferred embodiment of pole shoe 1 is illustrated in FIG. 2a. Referring to this figure, pole shoe 1 comprises a material of good magnetic conductivity, and is so designed that it cannot per se form a closed magnetic path solely with control electromagnet 3. Pole shoe 1 includes an outer circular ring 7 and a smaller circular surface 9 concentric with ring 7. Surface 9 is held on ring 7 by narrow connecting straps as illustrated. The cross section of these connecting straps is so selected that the magnetically conductive material of the straps is immediately saturated when electromagnet 3 is energized.

Figure 2B:
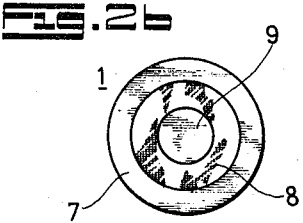
FIG. 2b is an elevational view of another form of pole shoe usable in the arrangement shown in FIG. 1.

FIG. 2b illustrates another embodiment of the pole shoe, wherein the outer circular ring 7 is connected mechanically only with the inner small circular surface 9 through the medium of a magnetically non-conductive material such as, for example, a dielectric or plastic composition ring 8.

Figure 3:
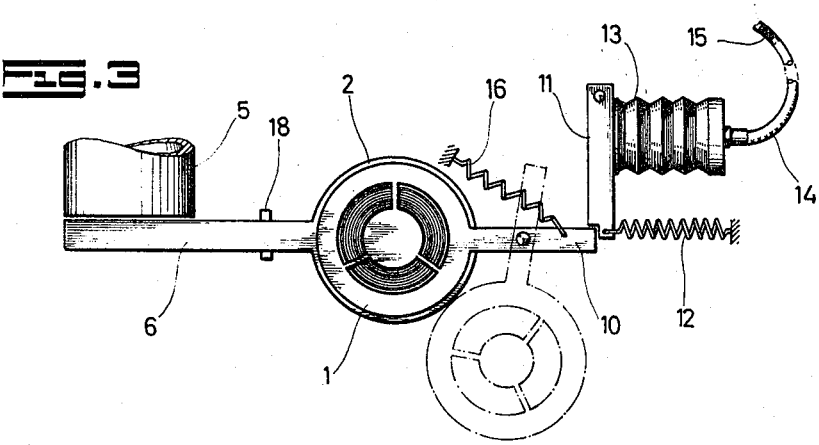
FIG. 3 is a somewhat schematic elevational view of a complete arrangement embodying the means shown in FIG. 1, and utilizing a lever mechanism for pivoting the pole shoe.

FIG. 3 shows, in a more complete state, the embodiment of the invention illustrated somewhat schematically in FIG. 1. Pole shoe 1 is arranged on a pivotally mounted lever 10 which has operatively associated therewith a tension spring 16 biasing lever 10 to the dot and dash line position of FIG. 3. In its rest position, before the start of the missile, lever 10 is aligned with the lever arm 2 of spoiler 6, and this lever arm 2 is designed as an armature for an electromagnet. Lever 10 is locked in this position by a latch 11 held in latching position by a bellows 13. Bellows 13 is filled with gas or liquid under a certain pressure, and thus maintains latch 11 in the illustrated position and against the force of a tension spring 12, latch 11 being held in locking relation with the end of lever 10.

Bellows 13 is connected by a line connection 14 with the combustion chamber of the missile, which combustion chamber has not been represented. At that end of line 14 connected with the combustion chamber, there is arranged a plug 15 of a low melting point material, and which melts directly after ignition of the engine, due to the high temperature prevailing in the combustion chamber. After plug 15 is melted, which occurs directly after the missile is started, the pressure in bellows 13 is determined only by the combustion chamber pressure. As soon as the combustion chamber pressure drops, at the end of the acceleration phase of the missile, the pressure in bellows 13 likewise drops. This decreases the force exerted on latch 11 so that, after the threshold value has dropped below a certain value, the latch 11 is disengaged by tension spring 12 from its locking position, and lever 10 is released. Lever 10 moves, under the bias of spring 16, into a position wherein pole shoe 1 no longer bears against control electromagnet 3.

Thus, upon receipt of further guide signals by control electromagnets 3 and 4, the lever arm of jet spoiler 6 is attracted to the full extent against electromagnet 3 when the latter is energized, so that spoiler blade 6 can now dip fully into the jet cross section of the missile.

FIG. 4 illustrates another embodiment of the invention which, though not quite so simple as the embodiment shown in FIGS. 1 and 3, provides for continuous variation of the depth of immersion of the spoiler blade 6 into the jet stream. Control electromagnets 3 and 4 are arranged on a pivoted or swingable base plate 17, and the lever arm 2 of spoiler 6 is arranged between these two electromagnets, being pivoted about its axis of rotation 18 depending upon which one of the two electromagnets is energized. Base plate 17 is angularly adjustable about the axis of rotation 18 of the jet spoiler, and the angular adjustment depends on the pressure in the combustion chamber acting on the bellows 13. As soon as the combustion chamber pressure, and thus the pressure of bellows 13 on base plate 17 decreases, base plate 17 is moved under the influence of a spring 20 by an amount corresponding to the drop in the combustion chamber pressure.

Swinging movement of base plate 17 is limited by stops 22, in both end positions. Bellows 13 is connected, through a line 14, similar to that shown in FIG. 3, with the combustion chamber, which again has not been illustrated. A plug of low melting point material is again arranged in the end of line 14 connected to the combustion chamber, so as to maintain an initial pressure in bellows 13. In the embodiment of FIG. 4, such a plug is not necessary if stops 22 are suitably designed and suitable measures are taken, through excitation of electromagnet 4, to prevent deflection of the jet or damage to spoiler 6 when the engine is ignited.

Through the medium of the devices shown in FIGS. 1, 3 and 4, for varying the depth of immersion of the spoiler blade in the jet stream cross section, the control vector of the jet spoiler is turned, at the same time, through a certain angular amount related to the missile. In other words, the compensation angle is varied. A twist-stabilized missile rotates about its longitudinal axis with a rolling frequency Ω, and this rolling frequency can vary with the individual phases but particularly in the starting phase and cruising phase of the missile. The control station transmitting guide signals to the missile is constantly informed, in any known manner, of the respective rolling frequency Ω and the rotary position of the missile. With the rolling frequency Ω, which is substantially constant during the cruising phase, the delay time in the actuation of the spoiler is taken into account in the transmission of the guide signals of the missile for actuating the jet spoiler. A guide signal has therefore already been transmitted to the missile in a rotary position of the latter at which the actual control movement of the jet spoiler may not yet even take place. By proper selection of this rotary position, with relation to the rolling frequency Ω, the jet spoiler can be made to perform a control movement at the end of an exact delay interval and at a time when the missile has a desired rotary position for this particular control movement.

The angle, between the rotary position of the missile when guide signals are transmitted thereto and its rotary position during actual performance of the control movement initiated by the guide signal and effected by the jet spoiler, is called angle or compensation. The size of this angle corresponds only to a certain angular velocity or rolling frequency Ω of the missile, so that a variation of this rolling frequency results in a variation in the angle of compensation.

FIG. 5 schematically illustrates the exit jet cross section of the missile to be controlled. During the cruising phase, jet spoiler blade 6 is, for example, in the 180° position of the missile is rotating about its longitudinal axis with the rolling frequency Ω. In order to move the jet spoiler blade 6 in exactly this 180° position of the missile, the missile must already have received its guide signal at a position in advance of the 180° position by the angle of compensation α. If the jet spoiler 6 has been turned, however, in the manner shown in broken lines, about the axis of rotation 18 during the acceleration phase of the missile and in such a way that the depth of immersion of jet spoiler blade 6 has been made correspondingly smaller, the angular position of the control vector of the spoiler blade will also be varied by an angle γ relative to the unturned, fully immersed jet spoiler blade position in the jet cross section of the combustion chamber nozzle 5 during the cruising phase.

Since the rolling frequency Ω decreases substantially immediately after the start of the missile, due to the opening of the folding wings and the resulting sudden increase of the moment of inertia, while the delay time for actuating the jet spoiler remains unchanged, the angle of compensation must be correspondingly smaller with the latter rolling frequency. Due to the rotation of base plate 17 in the form represented in FIG. 4, which depends on the combustion chamber pressure, and the retraction of pole shoe 1 as illustrated in FIGS. 1 and 3, respectively, the angle of compensation α is now reduced automatically by the value of angle γ, so that a compensation angle β, reduced in accordance with the lower rolling frequency Ω, is now obtained.

FIG. 6 illustrates an embodiment of the invention in which the control is exerted upon a pivotal or angularly adjustable thrust nozzle. The actuating device, including base plate 17', spring 20', control electromagnet 3' and bellows 13' is identical in construction and method of operation with the device shown in FIG. 4. When control electromagnet 3' is energized, a swingably mounted thrust nozzle 5' is turned, through lever mechanism 23 and 24, through a certain angle. Instead of the second control electromagnet 4, as provided in FIG. 4, a return spring 25 is provided in FIG. 6 and acts directly on thrust nozzle 5'. Spring 25 returns thrust nozzle 5' into the rest position when control electromagnet 3' is denergized. The size of the angle through which thrust nozzle 5' is swung is determined, in the manner described in connection with FIG. 4, by the respective combustion chamber pressure.

While specific embodiments of the invention have been shown and described in detail to illustrate the application of the principles of the invention, it will be understood that the invention may be embodied otherwise without departing from such principles.

What is claimed is:

1. A thrust vector control for a missile having a combustion chamber producing a propulsion jet, said control comprising, in combination, at least one device selectively operable on the propulsion jet to deflect the same laterally, in accordance with missile guidance signals, to control the effective thrust vector relative to the longitudinal axis of the missile; and means operatively associated with said device and communicating with the combustion chambers for direct subjection to the pressure within said combustion chamber, said means controlling the deflecting action of said device in accordance with the pressure within the combustion chamber.

2. A thrust vector control, as claimed in claim 1, in which said device comprises a jet nozzle angularly adjustable in at least one direction, said means controlling the angle of adjustment of said nozzle.

3. A thrust vector control, as claimed in claim 1, in which said device comprises at least one jet spoiler selectively immersible into said propulsion jet; said means regulating the depth of immersion of said jet spoiler in accordance with the pressure within the combustion chamber.

4. A thrust vector control, as claimed in claim 3, in which said means includes additional means operable on said device to control the direction of the effective thrust vector as well as the effective magnitude of the latter.

5. A thrust vector control, as claimed in claim 3, in which said jet spoiler includes a pivotally mounted lever arm forming a magnetic armature, and control electromagnetic means operatively associated with said magnetic armature; said means operatively associated with said device comprising a pole shoe selectively interposable between said control electromagnetic means and said magnetic armature, and lever mechanism operable to control the position of said pole shoe in accordance with the pressure within the combustion chamber.

6. A thrust vector control, as claimed in claim 5, in which said control electromagnetic means includes spaced poles and said lever arm, when engaged with said poles, forms a closed magnetic path therebetween; said pole shoe comprising spaced magnetically conductive material areas each cooperable with a respective pole and interconnected by material forming a high reluctance path between said areas so that said pole shoe cannot per se form a closed magnetic path with said spaced poles of said control electromagnetic means.

7. A thrust vector control, as claimed in claim 3, in which said jet spoiler is pivotal about a pivot axis and includes operating means for effecting pivoting thereof; a common support for said spoiler and its operating means mounted for pivoting about said pivot axis; said means operatively associated with said device pivoting said common support in accordance with the pressure within the combustion chamber.

8. A thrust vector control, as claimed in claim 7, in which said means operatively associated with said device includes a fluid filled bellows connected to said common support and communicating with the combustion chamber, said bellows moving said common support in accordance with the pressure within the combustion chamber, and spring means connected to said common support and acting in opposition to said bellows.

9. A thrust vector control, as claimed in claim 8, including a pressure line communicating at one end with said bellows and at the other end with the combustion chamber.

10. A thrust vector control, as claimed in claim 9, in which said bellows and said pressure line are filled with a compressed fluid at a pressure corresponding to the desired depth of immersion of said spoiler in the jet stream before ignition of the missile engine; and a plug of low melting point material initially closing that end of the pressure line opening into the combustion chamber, and melted upon inition of the missile engine.

References Cited
UNITED STATES PATENTS

| | | | |
|---|---|---|---|
| 2,879,955 | 3/1959 | Von Zborowski | 244—3.22 |
| 3,147,591 | 9/1964 | McEwen | 244—3.22 X |
| 3,276,376 | 10/1966 | Cubbison et al. | 244—3.22 |

BENJAMIN A. BORCHELT, *Primary Examiner.*

SAMUEL W. ENGLE, *Examiner.*

T. H. WEBB, *Assistant Examiner.*